United States Patent
Kobayashi et al.

(10) Patent No.: US 12,485,794 B2
(45) Date of Patent: Dec. 2, 2025

(54) IN-VEHICLE BATTERY MANAGEMENT DEVICE

(71) Applicant: PRIME PLANET ENERGY & SOLUTIONS, INC., Tokyo (JP)

(72) Inventors: Noriharu Kobayashi, Kakogawa (JP); Kimihiko Furukawa, Kakogawa (JP); Masaki Yugou, Kakogawa (JP); Shinya Inui, Kakogawa (JP); Kohki Nakamura, Okazaki (JP); Keiichi Ito, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 659 days.

(21) Appl. No.: 17/822,268

(22) Filed: Aug. 25, 2022

(65) Prior Publication Data

US 2023/0062034 A1    Mar. 2, 2023

(30) Foreign Application Priority Data

Sep. 2, 2021    (JP) ................. 2021-143235

(51) Int. Cl.
| | | |
|---|---|---|
| *B60L 58/16* | (2019.01) | |
| *B60L 53/00* | (2019.01) | |
| *G01R 31/36* | (2020.01) | |
| *G01R 31/392* | (2019.01) | |
| *H02J 7/00* | (2006.01) | |

(52) U.S. Cl.
CPC ............. *B60L 58/16* (2019.02); *B60L 53/00* (2019.02); *G01R 31/3648* (2013.01); *G01R 31/392* (2019.01); *H02J 7/005* (2020.01)

(58) Field of Classification Search
CPC ....................................................... B60L 58/16
USPC ............................................................ 320/109
See application file for complete search history.

(56) References Cited

U.S. PATENT DOCUMENTS

| | | | |
|---|---|---|---|
| 11,104,231 B2* | 8/2021 | Froelich | ............. B60L 58/21 |
| 2003/0057918 A1 | 3/2003 | Aoki et al. | |
| 2010/0033132 A1* | 2/2010 | Nishi | ............. B60L 3/0046 320/136 |
| 2011/0156652 A1* | 6/2011 | Kishiyama | ........... B60L 58/15 320/132 |

(Continued)

FOREIGN PATENT DOCUMENTS

| | | |
|---|---|---|
| CN | 108028438 A | 5/2018 |
| CN | 110998344 A | 4/2020 |

(Continued)

*Primary Examiner* — Jerry D Robbins
(74) *Attorney, Agent, or Firm* — Finnegan, Henderson, Farabow, Garrett and Dunner LLP

(57) ABSTRACT

An in-vehicle battery management device includes a controller configured or programmed to control a charge/discharge device such that the charge/discharge device performs charge or discharge on an in-vehicle battery of an electric vehicle in a predetermined processing condition, the in-vehicle battery being connected to the charge/discharge device. The controller includes a calculator configured or programmed to calculate a degree of deterioration progress of the in-vehicle battery based on charge/discharge information in the charge or discharge; and a communicator configured or programmed to notify a predetermined notification target of the calculated degree of deterioration progress.

5 Claims, 6 Drawing Sheets

(56) References Cited

U.S. PATENT DOCUMENTS

| | | | |
|---|---|---|---|
| 2013/0085696 A1 | 4/2013 | Xu et al. | |
| 2016/0159236 A1 | 6/2016 | Tagome et al. | |
| 2018/0210036 A1 | 7/2018 | Yamauchi et al. | |
| 2020/0116797 A1 | 4/2020 | Tsurutani et al. | |
| 2020/0247268 A1 | 8/2020 | Aoyama | |
| 2020/0319256 A1* | 10/2020 | Verma | B60L 58/16 |
| 2021/0268927 A1 | 9/2021 | Shimonishi et al. | |

FOREIGN PATENT DOCUMENTS

| | | |
|---|---|---|
| CN | 111969263 A | 11/2020 |
| CN | 113325316 A | 8/2021 |
| JP | 2003-092836 A | 3/2003 |
| JP | 2014-13245 A | 1/2014 |
| JP | 2015-014487 A | 1/2015 |
| JP | 2018-148720 A | 9/2018 |
| JP | 2019-080403 A | 5/2019 |

\* cited by examiner

IN-VEHICLE BATTERY MANAGEMENT DEVICE

CROSS REFERENCE TO RELATED APPLICATIONS

This application claims the benefit of priority to Japanese Patent No. 2021-143235 filed on Sep. 2, 2021. The entire contents of this application are hereby incorporated herein by reference.

BACKGROUND

The present disclosure relates to an in-vehicle battery management device.

JP2019-80403A discloses a charge and discharge management system including an in-vehicle battery mounted on a vehicle and a charge and discharge device that charges and discharges the in-vehicle battery. The charge and discharge device is capable of selectively perform discharge of electric power from the in-vehicle battery to a grid power network and supply of electric power from the grid power network to the in-vehicle battery. The charge and discharge management system disclosed in this publication includes a battery deterioration notification unit that notifies a user or an owner of a vehicle of the degree of deterioration progress of the in-vehicle battery due to charge and discharge operation between the in-vehicle battery and the grid power network. With the notification of the degree of deterioration progress of the in-vehicle battery, the user or the owner of the vehicle is allowed to compare a merit in charge and discharge by using the in-vehicle battery in order to adjust a supply-demand balance and a decrease in asset value of the vehicle caused by deterioration of the battery. The publication describes that it is therefore easily determined whether to permit use of the in-vehicle battery in order to adjust the supply-demand balance.

SUMMARY

Inventors of the present disclosure found that the deterioration degree of an in-vehicle battery varies depending on the difference in calculation method in some cases. The inventors intend to provide a method for using the deterioration degree of an in-vehicle battery calculated with higher accuracy.

An in-vehicle battery management device disclosure here includes a controller configured or programmed to control a charge/discharge device such that the charge/discharge device performs charge or discharge on an in-vehicle battery of an electric vehicle in a predetermined processing condition, the in-vehicle battery being connected to the charge/discharge device. The controller includes a calculator configured or programmed to calculate a degree of deterioration progress of the in-vehicle battery based on charge/discharge information in the charge or discharge; and a communicator configured or programmed to notify a predetermined notification target of the calculated degree of deterioration progress.

In the electric vehicle, a degree of deterioration progress of the in-vehicle battery may be set. The controller may further include a second communicator configured or programmed to encourage correction of the degree of deterioration progress set in the in-vehicle battery based on the degree of deterioration progress calculated based on the charge/discharge information, and receive a result on whether the degree of deterioration progress is corrected or not.

In the electric vehicle, a degree of deterioration progress may be calculated. The controller may further include: an acquirer configured or programmed to acquire the degree of deterioration progress calculated in the electric vehicle; and a first determiner configured or programmed to determine whether at least one of the degree of deterioration acquired from the electric vehicle or the degree of deterioration progress calculated based on the charge/discharge information is less than or equal to a predetermined value. The communicator may be configured or programmed to notify the predetermined notification target of the degree of deterioration progress if at least one of the degree of deterioration progress acquired from the electric vehicle or the degree of deterioration progress calculated based on the charge/discharge information is less than or equal to a predetermined value.

In the electric vehicle, a degree of deterioration progress may be calculated. The controller may further include: an acquirer configured or programmed to acquire the degree of deterioration progress calculated in the electric vehicle; and a second determiner configured or programmed to determine whether the degree of deterioration progress acquired from the electric vehicle and the degree of deterioration progress calculated based on the charge/discharge information are separated from each other by a predetermined value or more. The communicator may be configured or programmed to notify the predetermined notification target of the degree of deterioration progress if the degree of deterioration progress acquired from the electric vehicle and the degree of deterioration progress calculated based on the charge/discharge information are separated from each other by a predetermined value or more.

The controller may further include: a memory configured or programmed to store the degree of deterioration progress calculated based on the charge/discharge information; and an estimator configured or programmed to estimate a life of the in-vehicle battery based on the stored degree of deterioration progress.

The controller may further include a setter configured or programmed to set a charge/discharge condition of the in-vehicle battery based on the degree of deterioration progress calculated based on the charge/discharge information.

DETAILED DESCRIPTION

Figure 1:
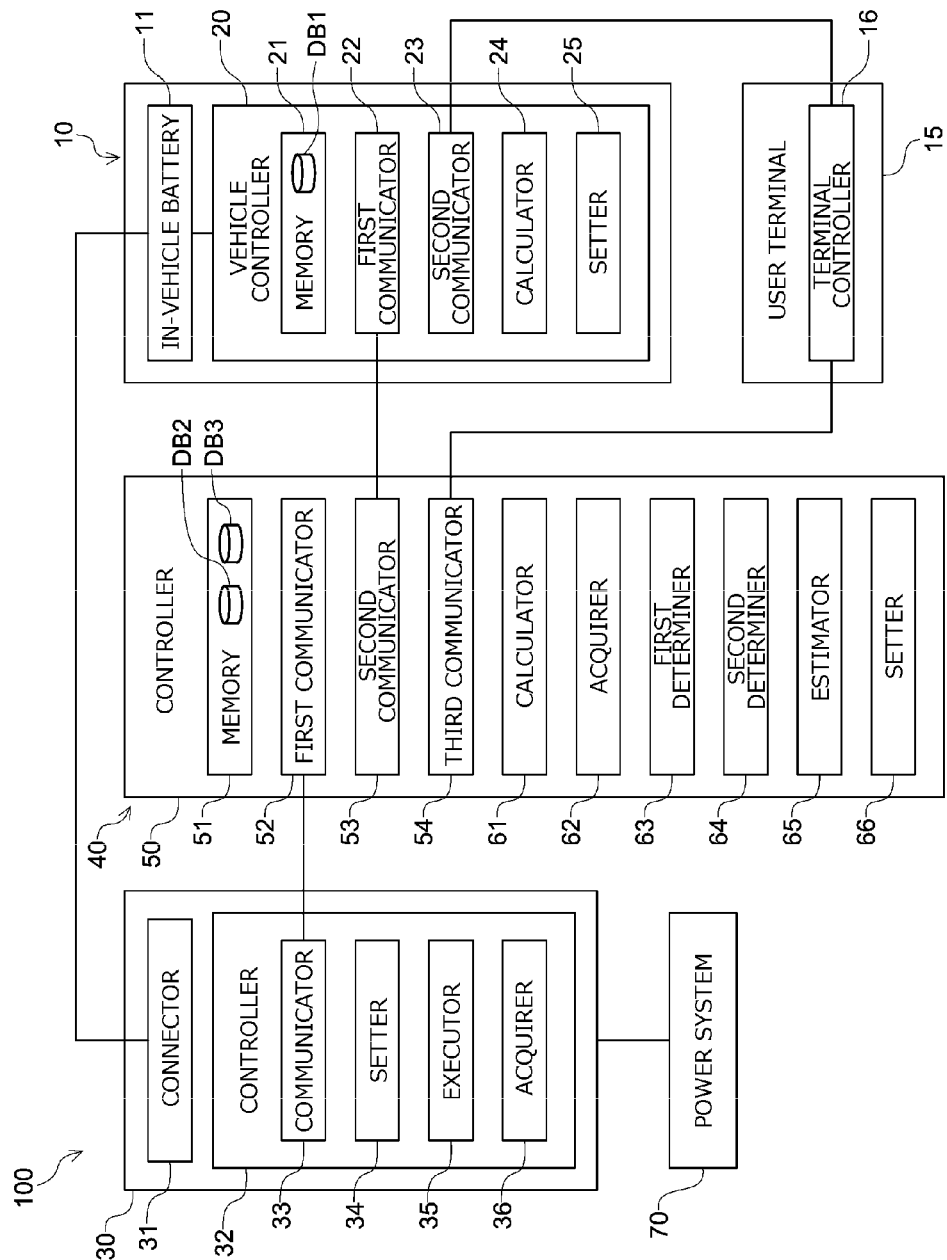
FIG. 1 is a block diagram illustrating an in-vehicle battery management system 100.

One embodiment of an in-vehicle battery management device disclosed here will be described below with reference to the drawings. The embodiment described here is, of course, not intended to particularly limit the present disclosure. The present disclosure is not limited to the embodiment disclosed here unless otherwise specified. Members and parts having the same functions are denoted by the same reference numerals as appropriate, and description for the same members and parts will not be repeated as appropriate.

<in-Vehicle Battery Management System 100>

FIG. 1 is a block diagram illustrating an in-vehicle battery management system 100, As illustrated in FIG. 1, the in-vehicle battery management system 100 includes a charge/discharge device 30 that connects an electric vehicle 10 to a power system 70 and charges and discharges (hereinafter referred to as charges/discharges) an in-vehicle battery 11 mounted on the electric vehicle 10, and an in-vehicle battery management device 40 that controls the charge/discharge device 30 and manages the in-vehicle battery 11. The in-vehicle battery management system 100 may include a power storage device (not shown) that storages electric power. The in-vehicle battery management system 100 is managed by a system manager, <Electric Vehicle 10>

The electric vehicle 10 is a vehicle on which a rechargeable in-vehicle battery 11 is mounted. The electric vehicle 10 travels using electric power obtained from the in-vehicle battery 11 as an energy source. Examples of the electric vehicle 10 include vehicles using electric power as an energy source, such as battery electric vehicles, hybrid electric vehicles, and plug-in hybrid electric vehicles. The electric vehicle 10 may be a four-wheeled vehicle or a two-wheeled vehicle. A user of the electric vehicle 10 uses a user terminal 15. The user terminal 15 may be, for example, a car navigation system mounted on the electric vehicle 10, or a smartphone, a tablet terminal, a personal computer of a desktop type or a laptop type used by the user. The user terminal 15 includes, for example, an input unit for input by user's operation, such as a touch panel, a keyboard, or a mouse, and a screen. The user terminal 15 includes a terminal controller 16. The user terminal 15 is configured to communicate with the electric vehicle 10 and the in-vehicle battery management device 40 through the terminal controller 16. The user can obtain information on the electric vehicle 10 and the in-vehicle battery 11 through the user terminal 15.

The electric vehicle 10 includes a vehicle controller 20. The vehicle controller 20 is communicably connected to the in-vehicle battery 11. The vehicle controller 20 includes a memory 21, a first communicator 22, a second communicator 23, a calculator 24, and a setter 25. Each of the units 21 through 25 of the vehicle controller 20 may be implemented by one or more processors, or may be incorporated in a circuit. The vehicle controller 20 is configured to communicate with the in-vehicle battery management device 40 through the first communicator 22. The vehicle controller 20 is configured to communicate with the user terminal 15 through the second communicator 23. The memory 21 stores a deterioration progress degree database DB1. The deterioration progress degree database DB1 stores a degree of deterioration progress calculated by the calculator 24 of the vehicle controller 20.

Deterioration of the in-vehicle battery 11 can progress with the use of the electric vehicle 10 and charge/discharge. In the electric vehicle 10, the degree of deterioration progress of the in-vehicle battery 11 is set. The electric vehicle 10 is configured to calculate the degree of deterioration progress of the in-vehicle battery 11. The degree of deterioration progress of the in-vehicle battery 11 is calculated by the calculator 24 of the vehicle controller 20. In this embodiment, the degree of deterioration progress of the in-vehicle battery 11 is expressed as a state of health (SOH). For example, the degree of deterioration progress of the in-vehicle battery 11 can be expressed as a full charge capacity in calculating the degree of deterioration progress with respect to a full charge capacity of the in-vehicle battery 11 in initial use of the electric vehicle 10. The full charge capacity of the in-vehicle battery 11 in initial use of the electric vehicle 10 is recorded in, for example, the calculator 24. In this embodiment, the calculator 24 calculates the degree of deterioration progress in traveling of the electric vehicle 10 or charge/discharge of the electric vehicle 10. For example, a charge/discharge capacity when the in-vehicle battery 11 is charged/discharged within a specific SOC range is measured. Next, from the charge/discharge capacity measured within the SOC range of charge/discharge, a full charge capacity (i.e., battery capacity with 100% of SOC) is calculated. Then, the full charge capacity calculated here with respect to the full charge capacity of the in-vehicle battery 11 in initial use of the electric vehicle 10 is obtained, thereby calculating a degree of deterioration progress.

The setter 25 sets the degree of deterioration progress calculated by the calculator 24 as a degree of deterioration progress of the in-vehicle battery 11. The setter 25 can also correct the degree of deterioration progress of the in-vehicle battery 11 based on a degree of deterioration progress calculated by the in-vehicle battery management device 40 described later. The degree of deterioration progress set by the setter 25 can be used for, for example, defining a charge/discharge range in use of the electric vehicle 10 or charge/discharge of the in-vehicle battery 11 and determining a replacement timing of the in-vehicle battery 11.

<Charge/Discharge Device 30>

The charge/discharge device 30 is used for charging and discharging the in-vehicle battery 11 of the electric vehicle 10. The charge/discharge device 30 includes a connector 31 and a controller 32. The controller 32 includes a communicator 33, a setter 34, an executor 35, and an acquirer 36. The controller 32 can be, for example, a microcomputer. Each of the units 33 through 36 of the controller 32 may be implemented by one or more processors, or may be incorporated in a circuit. The controller of 32 the charge/discharge device 30 is configured to communicate with the in-vehicle battery management device 40 through the communicator 33.

The connector 31 of the charge/discharge device 30 is connected to the electric vehicle 10. The in-vehicle battery 11 is charged and discharged through the connector 31, The connector 31 can be, but not limited to, a charge/discharge cable, for example. The charge/discharge device 30 is configured to supply electric power from the power storage device to the in-vehicle battery 11 through the connector 31. The charge/discharge device 30 is configured to supply electric power from the in-vehicle battery 11 to the power storage device through the connector 31. The electric vehicle 10 is connected to the power system 70 through the charge/discharge device 30.

The power system 70 is constituted by electrical facilities that perform power generation, transmission, transformation, and distribution, for example. The power system 70 supplies electric power to an electrical facility of a consumer depending on a power demand. The amount of electric power is adjusted to keep a balance between demand and supply, Such adjustment of power supply and demand can be managed by a manager also called an aggregator. The aggregator can also be a system manager of the in-vehicle battery management system 100.

<In-Vehicle Battery Management Device 40>

The in-vehicle battery management device 40 manages information on, for example, charge/discharge of the in-vehicle battery 11 in the electric vehicle 10 and a use situation and a deterioration state of the in-vehicle battery 11. In this embodiment, the in-vehicle battery management device 40 manages a deterioration state of the in-vehicle battery 11 as a degree of deterioration progress. The in-vehicle battery management device 40 may be implemented by a single computer or a plurality of computers in cooperation. The in-vehicle battery management device 40 can be managed by the system manager of the in-vehicle battery management system 100.

The in-vehicle battery management device 40 includes a controller 50. The controller 50 can be, for example, a microcomputer. The controller 50 includes a memory 51, a first communicator 52, a second communicator 53, a third communicator 54, a calculator 61, an acquirer 62, a first determiner 63, a second determiner 64, an estimator 65, and a setter 66. Each of the units 51 through 66 of the controller 50 may be implemented by one or more processors, or may be incorporated in a circuit. The controller 50 is configured to communicate with the charge/discharge device 30 through the first communicator 52. The controller 50 is configured to communicate with the electric vehicle 10 through the second communicator 53. The controller 50 is configured to communicate with the user terminal 15 through the third communicator 54.

The memory 51 stores a charge/discharge condition database DB2 and a deterioration progress degree database DB3. Various charge/discharge conditions are registered in the charge/discharge condition database DB2. As the charge/discharge conditions, parameters such as a current, a voltage, and a charge/discharge range for controlling charge, discharge, stop of charge/discharge, and so forth are registered. The charge/discharge condition database DB2 stores, for example, a charge/discharge condition in normal charge/discharge and a charge/discharge condition for calculating a degree of deterioration progress described later. The deterioration progress degree database DB3 stores the degree of deterioration progress calculated by the in-vehicle battery management device 40.

The degree of deterioration progress of the in-vehicle battery 11 can be set based on the deterioration progress degree database DB1 stored in the memory 21 of the vehicle controller 20. The inventors of the present disclosure found that in the case of using the electric vehicle 10 for a long period, for example, a difference might occur between a degree of deterioration progress set based on the deterioration progress degree database DB1 and an actual degree of deterioration progress of the in-vehicle battery 11. The degree of deterioration progress of the in-vehicle battery 11 is used for, for example, defining a charge/discharge range where the in-vehicle battery 11 can be used. In a case where a difference occurs between the degree of deterioration progress set in the vehicle controller 20 and the actual degree of deterioration progress, the charge/discharge range might be set inappropriately. If the charge/discharge range is set inappropriately, the in-vehicle battery 11 can deteriorate early. For example, retaining the in-vehicle battery 11 in a high SOC can facilitate deterioration of the in-vehicle battery 11. If the actual degree of deterioration progress of the in-vehicle battery 11 is lower than the set degree of deterioration progress, the in-vehicle battery 11 is charged in an unnecessarily high SOC so that deterioration of the in-vehicle battery 11 might further progress. The inventors of the present disclosure intend to provide a method for accurately calculating and using the degree of deterioration progress of the in-vehicle battery 11.

Figure 2:
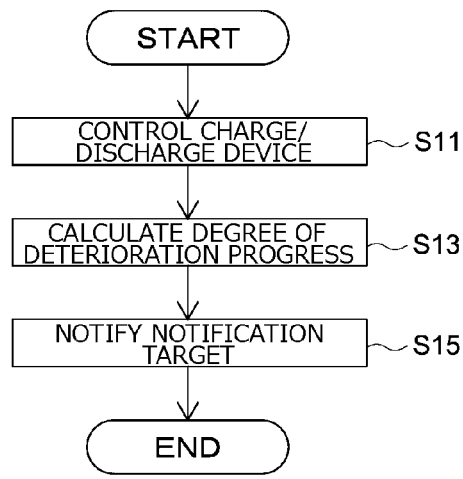
FIG. 2 is a flowchart depicting a procedure of a process executed by an in-vehicle battery management device 40.

FIG. 2 is a flowchart depicting a procedure of a process executed by the in-vehicle battery management device 40. The in-vehicle battery management device 40 is configured to perform a process S11 of controlling the charge/discharge device 30 to which the in-vehicle battery 11 of the electric vehicle 10 is connected such that the charge/discharge device 30 charges or discharges the in-vehicle battery 11 in a predetermined processing condition, a process S13 of calculating a degree of deterioration progress of the in-vehicle battery 11 based on charge/discharge information in charge/discharge, and a process S15 of notifying a predetermined notification target of the calculated degree of deterioration progress. The processes will be specifically described below.

These processes are performed in a case where the electric vehicle 10 is connected to the connector 31 of the charge/discharge device 30 and a user wants to have a degree of deterioration progress calculated in the in-vehicle battery management device 40. These processes may be regularly performed, for example, once in a month.

The process S11 of controlling the charge/discharge device 30 starts when a calculation signal is transmitted to the charge/discharge device 30 through the first communicator 52 of the controller 50 of the in-vehicle battery management device 40 in a state where the electric vehicle 10 is connected to the connector 31 of the charge/discharge device 30. The calculation signal may be transmitted at the time when the user issues an instruction through the user terminal 15 or may be regularly transmitted from the controller 50.

When the charge/discharge device 30 receives the calculation signal through the communicator 33, the setter 34 sets a charge/discharge condition in a charge/discharge condition for calculating a degree of deterioration progress. In this embodiment, the charge/discharge condition for calculating degree of deterioration progress is stored in the charge/discharge condition database DB2. The charge/discharge condition for calculating a degree of deterioration progress is transmitted together with the calculation signal from the controller 50 to the charge/discharge device 30. Thereafter, the setter 34 sets the charge/discharge condition for calculating a degree of deterioration progress. Setting of the charge/discharge condition for calculating a degree of deterioration progress is not limited to this example. For example, a charge/discharge condition may be registered in the setter 34 beforehand and the charge/discharge condition for calculating a degree of deterioration progress may be set when the calculation signal is received. In this embodiment, in the charge/discharge condition for calculating a degree of deterioration progress, first, the battery is discharged until the SOC reaches a predetermined value. Next, the battery is charged until the SOC reaches a predetermined value. From the viewpoint of accurately calculating a degree of deterioration progress, the SOC range here is preferably as large as possible.

In a case where the user does not want to calculate a degree of deterioration progress or a case where is it not the time to calculate a degree of deterioration progress, no calculation signal is transmitted. In this case, the setter 34 sets a normal charge/discharge condition, and charge/discharge starts. The normal charge/discharge condition can be, for example, a charge condition in a case where the battery is charged to a predetermined charge amount at a predetermined charge rate after use of the electric vehicle 10. The normal charge/discharge condition can be determined in accordance with a degree of deterioration progress set in the in-vehicle battery 11, for example. The normal charge/discharge condition includes a charge/discharge range of the in-vehicle battery 11 defined in accordance with the degree of deterioration progress.

The executor 35 performs discharge of the in-vehicle battery 11 in accordance with the charge/discharge condition for calculating a degree of deterioration progress set by the setter 34. The in-vehicle battery 11 is discharged through the connector 31. The in-vehicle battery 11 is discharged until the SOC reaches a predetermined value. The SOC at this time is not specifically limited, and in this embodiment, the in-vehicle battery 11 is discharged until the SOC reaches 0%. In some cases, the in-vehicle battery 11 cannot be discharged until the SOC reaches 0% in a case where a plurality of storage batteries are used as the in-vehicle battery 11 and a battery voltage varies among the storage batteries, for example. In this case, the in-vehicle battery 11 is discharged until the SOC reaches near 0%.

The executor 35 performs charge of the in-vehicle battery 11 in accordance with the charge/discharge condition for calculating a degree of deterioration progress set by the setter 34. The in-vehicle battery 11 is charged through the connector 31. The in-vehicle battery 11 is charged until the SOC reaches a predetermined value. The SOC at this time is not specifically limited, and in this embodiment, the in-vehicle battery 11 is charged with a constant current until the SOC reaches 100%. In some cases, the in-vehicle battery 11 cannot be charged until the SOC reaches 100% in a case where a plurality of storage batteries are used as the in-vehicle battery 11 and a battery voltage varies among the storage batteries, for example. In this case, the in-vehicle battery 11 is charged until the SOC reaches near 100%.

In charging, the acquirer 36 acquires charge/discharge information for calculating a degree of deterioration progress in the in-vehicle battery management device 40. The charge/discharge information for calculating a degree of deterioration progress in the in-vehicle battery management device 40 will also be referred to as "charge/discharge information I." In this embodiment, the charge/discharge information I is a charge capacity in a case where the battery is charged such that the SOC reaches 100% from 0%. The charge/discharge information I can include, for example, a charge current, a charge voltage, and a charge time. The charge/discharge information I acquired by the acquirer 36 is transmitted to the in-vehicle battery management device 40 through the communicator 33. The in-vehicle battery management device 40 receives the charge/discharge information I through the first communicator 52.

In S13 of FIG. 2, the calculator 61 of the in-vehicle battery management device 40 calculates a degree of deterioration progress of the in-vehicle battery 11 based on the received charge/discharge information I. A full charge capacity in initial use of the electric vehicle 10 is registered beforehand in the calculator 61. The calculator 61 calculates a degree of deterioration progress of the in-vehicle battery 11 based on the registered full charge capacity and the charge/discharge information I (e.g., charged amount in a case where the battery is charged such that the SOC reaches 100% from 0%). The degree of deterioration progress calculated by the calculator 61 in the in-vehicle battery management device 40 based on the charge/discharge information I will also be referred to as "deterioration progress degree A."

In S15 of FIG. 2, a predetermined notification target is notified of the deterioration progress degree A calculated in the in-vehicle battery management device 40. In this embodiment, the third communicator 54 transmits the deterioration progress degree A to the user terminal 15. In this embodiment, the user terminal 15 is configured to check the deterioration progress degree database DB1. The user can check the transmitted deterioration progress degree A and compare the transmitted deterioration progress degree A with the degree of deterioration progress stored in the deterioration progress degree database DB1. The user can check the deterioration progress degree A to select a value to be set as a degree of deterioration progress of the in-vehicle battery 11. For example, the user can select setting of the deterioration progress degree A as the degree of deterioration progress of the in-vehicle battery 11 or select correction of the degree of deterioration progress set based on the deterioration progress degree database DB1 by using the deterioration progress degree A. Depending on the selection of the user, the setter 25 sets the degree of deterioration progress of the in-vehicle battery 11.

The degree of deterioration progress stored in the deterioration progress degree database DB1 of the vehicle controller 20 is a degree of deterioration progress calculated in a condition different from the deterioration progress degree A calculated in the in-vehicle battery management device 40. In this embodiment, the deterioration progress degree database DB1 stores the degree of deterioration progress calculated by the calculator 24 of the vehicle controller 20. The calculator 24 calculates a degree of deterioration progress based on information acquired in traveling of the electric vehicle 10 or normal charge/discharge of the battery. The degree of deterioration progress calculated in the vehicle controller 20 will also be referred to as a "deterioration progress degree B." The deterioration progress degree B can be more frequently calculated than the deterioration progress degree A.

In the embodiment described above, the in-vehicle battery management device 40 is configured to perform the process of controlling the charge/discharge device 30 to which the in-vehicle battery 11 of the electric vehicle 10 is connected such that the in-vehicle battery 11 is charged or discharged in a predetermined processing condition. The in-vehicle battery management device 40 is configured to perform the process of calculating the deterioration progress degree A of the in-vehicle battery 11 based on the charge/discharge information I in charge/discharge. The deterioration progress degree A of the in-vehicle battery 11 calculated in the in-vehicle battery management device 40 can be used for evaluating the deterioration degree of the in-vehicle battery 11 more accurately than the deterioration progress degree B calculated in the vehicle controller 20 of the electric vehicle 10. For example, to increase computation performance of a computation device of a vehicle, costs for the vehicle increase. Thus, a capacity allocated to computation for evaluating a deterioration degree of the in-vehicle battery 11 in computation performance of the computation device of the vehicle is limited. On the other hand, the in-vehicle battery management device 40 does not have such a limitation. Thus, the in-vehicle battery management device 40 enables more precise computation in evaluating the deterioration degree of the in-vehicle battery 11.

In calculating the deterioration progress degree B in the vehicle controller 20, the charge/discharge range for calculation depends on an ordinary use environment in using the electric vehicle 10 and a charge/discharge range. In the vehicle controller 20 mounted on the vehicle, conditions for charge/discharge are determined depending on the use situation of the electric vehicle 10. Thus, it is difficult in the vehicle controller 20 to achieve appropriate charge/discharge conditions in evaluating a deterioration degree of the in-vehicle battery 11. Then, based on charge/discharge as an outcome depending on the use situation of the electric vehicle 10, the deterioration degree of the in-vehicle battery 11 can be evaluated to calculate the deterioration progress degree B. On the other hand, in the in-vehicle battery management device 40, the in-vehicle battery 11 is charged/discharged in a state where the electric vehicle 10 is connected to the charge/discharge device 30 such as a charging station. Thus, the in-vehicle battery management device 40 can easily achieve appropriate charge/discharge conditions in evaluating the deterioration degree of the in-vehicle battery 11. In this embodiment, the in-vehicle battery management device 40 is preferably configured to control the charge/discharge device 30 such that the in-vehicle battery 11 is charged or discharged in appropriate predetermined processing conditions in evaluating the deterioration degree of the in-vehicle battery 11. Based on the charge/discharge information I obtained in this control, the deterioration progress degree A is calculated. For example, in a state where the electric vehicle 10 is stopped and connected to the charge/discharge device 30, charge/discharge can be performed such that the in-vehicle battery 11 is temporarily discharged until the SOC reaches 0%, and then is charged until the SOC reaches 100%, In this case, a charge capacity until the SOC reaches 100% from 0% can be measured so that a full charge capacity can be evaluated. The comparison with the full charge capacity in initial use of the in-vehicle battery 11 enables evaluation of capacity deterioration of the in-vehicle battery 11. In the in-vehicle battery 11, when the in-vehicle battery management device 40 includes data serving as a reference to battery performance, such as charge/discharge performance, the charge/discharge information I obtained in control of the in-vehicle battery management device 40 can be more precisely analyzed, and a deterioration progress degree A can be calculated in consideration of information other than the battery capacity. Since the model (type) of the in-vehicle battery 11 can vary depending on the type of the electric vehicle 10, data as a reference can be included for each type of the in-vehicle battery 11.

Figure 3:
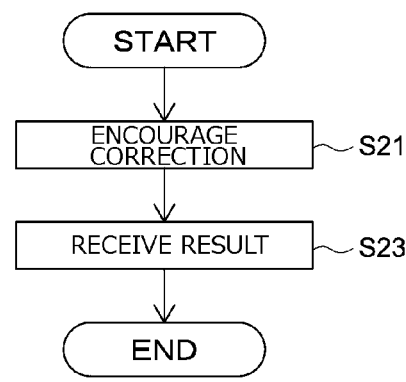
FIG. 3 is a flowchart depicting a procedure of a process of correcting the degree of deterioration progress set in an in-vehicle battery 11.

Then, description will be given on a process in the case of correcting the degree of deterioration progress set in the in-vehicle battery 11 by using the deterioration progress degree A calculated in the in-vehicle battery management device 40. FIG. 3 is a flowchart depicting a procedure of a process of correcting the degree of deterioration progress set in the in-vehicle battery 11. The in-vehicle battery management device 40 is configured to further perform a process S21 of encouraging correction of the deterioration progress degree B set in the in-vehicle battery 11 based on the deterioration progress degree A calculated based on the charge/discharge information I and a process S23 of receiving a result on whether the degree of deterioration progress has been corrected or not.

In S21 of FIG. 3, the in-vehicle battery management device 40 transmits the deterioration progress degree A calculated in the in-vehicle battery management device 40, to the electric vehicle 10 through the second communicator 53. In addition, the in-vehicle battery management device 40 also transmits a correction signal for encouraging correction of the deterioration progress degree B set in the in-vehicle battery 11. The vehicle controller 20 of the electric vehicle 10 receives the correction signal through the first communicator 22. When receiving the correction signal, the vehicle controller 20 transmits a check signal for encouraging checking of the degree of deterioration progress to the user terminal 15 through the second communicator 23. When the user terminal 15 receives the check signal, the user is encouraged to check the degree of deterioration progress with the user terminal 15. In addition, selection of necessity of correction is encouraged based on the deterioration progress degree A. If the user permits correction, the setter 25 of the vehicle controller 20 corrects the deterioration progress degree B of the in-vehicle battery 11 based on the deterioration progress degree A. If the user does not permit correction, the setter 25 maintains the deterioration progress degree B set in the in-vehicle battery 11. When the degree of deterioration progress is corrected, the first communicator 23 transmits the corrected degree of deterioration progress to the in-vehicle battery management device 40.

A correction method is not specifically limited in a case where the deterioration progress degree B of the in-vehicle battery 11 is corrected based on the deterioration progress degree A calculated in the in-vehicle battery management device 40. For example, the correction may be performed such that the corrected degree of deterioration progress is between the deterioration progress degree B and the deterioration progress degree A before the correction. For example, the correction may be performed such that the corrected degree of deterioration progress is an average value of the deterioration progress degree B before the correction and the deterioration progress degree A. With this correction, the value set as the degree of deterioration progress of the in-vehicle battery 11 can approach the deterioration progress degree A stepwise. The correction may be performed such that the corrected degree of deterioration progress is the deterioration progress degree A, The corrected degree of deterioration progress of the in-vehicle battery 11 may be stored in the deterioration progress degree database DB1 of the vehicle controller 20. The stored degree of deterioration progress may be used for calculating a degree of deterioration progress in a subsequent process.

In S23 of FIG. 3, the second communicator 53 of the in-vehicle battery management device 40 receives a degree of deterioration progress that has been set. Accordingly, the in-vehicle battery management device 40 can receive a result on whether the degree of deterioration progress was corrected or not. The received degree of deterioration progress may be stored in the deterioration progress degree database DB3.

In the embodiment described above, the deterioration progress degree B of the in-vehicle battery 11 is set in the electric vehicle 10. The in-vehicle battery management device 40 is configured to perform a process of encouraging correction of the deterioration progress degree B set in the in-vehicle battery 11 based on the deterioration progress degree A calculated based on the charge/discharge information I. This configuration enables a user to correct the deterioration progress degree B by using the deterioration progress degree A calculated with higher accuracy.

In the embodiment described above, when the process S21 (see FIG. 3) of encouraging the deterioration progress degree B set in the in-vehicle battery 11 is performed, the user selects necessity of correction through the user terminal 15. However, the present disclosure is not limited to this example. For example, in a case where the user permits correction beforehand, the degree of deterioration progress of the in-vehicle battery 11 may be automatically corrected based on the deterioration progress degree A calculated in the in-vehicle battery management device 40.

Figure 4:
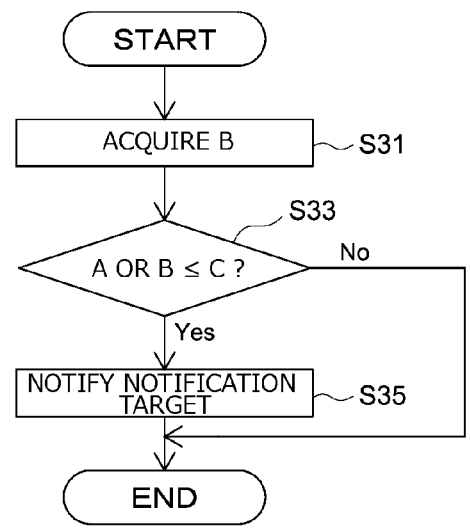
FIG. 4 is a flowchart depicting a procedure of a process of notifying a deterioration progress situation in the in-vehicle battery 11.

FIG. 4 is a flowchart depicting a procedure of a process of notifying a deterioration progress situation of the in-vehicle battery 11. The in-vehicle battery management device 40 is configured to further perform a process S31 of acquiring a deterioration progress degree B calculated in the electric vehicle 10 (i. e., vehicle controller 20), and processes S33 and 35 of notifying a predetermined notification target of a degree of deterioration progress if at least one of the deterioration progress degree B acquired from the electric vehicle 10 or the deterioration progress degree A calculated based on the charge/discharge information I is less than or equal to a predetermined value (hereinafter also referred to as a "set value C").

In S31 of FIG. 4, the acquirer 62 acquires the calculated deterioration progress degree B calculated in the vehicle controller 20. In this embodiment, the deterioration progress degree B stored in the deterioration progress degree database DB1 of the vehicle controller 20 is transmitted to the in-vehicle battery management device 40 through the first communicator 22. The acquirer 62 acquires the transmitted deterioration progress degree B. At this time, the acquired deterioration progress degree B may be stored in the deterioration progress degree database DB3. The acquired deterioration progress degree B may also be stored in the deterioration progress degree database DB3 separately from the deterioration progress degree A calculated in the in-vehicle battery management device 40.

In S33 of FIG. 4, the first determiner 63 determines whether the deterioration progress degree A calculated in the in-vehicle battery management device 40 or the deterioration progress degree B calculated in the vehicle controller 20 is less than or equal to the set value C or not (i.e., A or B≤C). The set value C may be set at any value by a user of the electric vehicle 10, for example, or may be selected from, for example, SOHs of 50%, 60%, and 70% by the user. The set value C may be set by, for example, an aggregator or a vehicle mechanic (e.g., dealer) who inspects and maintains the electric vehicle 10.

Here, if none of the deterioration progress degree A and the deterioration progress degree B is less than or equal to the set value C, the determination result in S33 is NO. In this case, the degree of deterioration progress is not notified. If at least one of the deterioration progress degree A or the deterioration progress degree B is less than or equal to the set value C, the determination result in S33 is YES, and the process proceeds to S35.

In S35 of FIG. 4, the predetermined notification target is notified of one of the deterioration progress degree A or the deterioration progress degree B that is less than or equal to the set value C. In this embodiment, the user is notified of the degree of deterioration progress less than or equal to the set value C. The degree of deterioration progress is transmitted to the user terminal 15 through the third communicator 54. In the user terminal 15, the terminal controller 16 receives the degree of deterioration progress. The user can check the received degree of deterioration progress on, for example, a screen of the user terminal 15.

Figure 5:
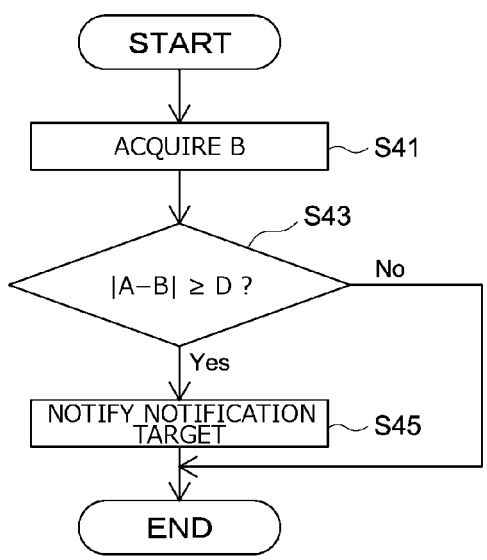
FIG. 5 is a flowchart depicting a procedure of a notification process in a case where a deterioration progress degree A and a deterioration progress degree B are different from each other.

FIG. 5 is a flowchart depicting a procedure of a notification process in a case where the deterioration progress degree A and the deterioration progress degree B are separated from each other. The in-vehicle battery management device 40 is configured to further perform a process S41 of acquiring the deterioration progress degree B calculated in the electric vehicle 10 (i.e., vehicle controller 20), and processes S43 and 45 of issuing notification to a predetermined notification target if the deterioration progress degree B acquired from the electric vehicle 10 and the deterioration progress degree A calculated based on the charge/discharge information I are separated from each other by a predetermined value (hereinafter also referred to as a "set value D") or more.

In S41 of FIG. 5, in a manner similar to S31 of FIG. 4, the acquirer 62 acquires the deterioration progress degree B calculated in the vehicle controller 20. In S43 of FIG. 5, the second determiner 64 determines whether or not the deterioration progress degree A calculated in the in-vehicle battery management device 40 and the deterioration progress degree B calculated in the vehicle controller 20 are separated from each other by the set value D or more (i.e., |A−B|≥D). The set value D may be set at any value by the user of the electric vehicle 10, for example, or may be selected from, for example, SOHs of 5% and 10% by the user. The set value D may be set by, for example, an aggregator or a vehicle mechanic who inspects and maintains the electric vehicle 10.

Here, if the deterioration progress degree A and the deterioration progress degree B are not separated from each other by the set value D or more, the determination result in S43 is NO. In this case, the notification target is not notified. If the deterioration progress degree A and the deterioration progress degree B are separated from each other by the set value D or more, the determination result in S43 is YES, and the process proceeds to S45.

In S45 of FIG. 5, if the deterioration progress degree A and the deterioration progress degree B are separated from each other by the set value D or more, the predetermined notification target is notified. In this embodiment, the user is notified of the deterioration progress degree A and the deterioration progress degree B. The deterioration progress degree A and the deterioration progress degree B are transmitted to the user terminal 15 through the third communicator 54. In the user terminal 15, the terminal controller 16 receives the degree of deterioration progress. The user can check the received degree of deterioration progress on, for example, the screen of the user terminal 15.

The in-vehicle battery management device 40 is configured such that if at least one of the deterioration progress degree B acquired from the electric vehicle 10 or the deterioration progress degree A calculated based on the charge/discharge information I is less than or equal to a predetermined value, a process of notifying a predetermined notification target of the degree of deterioration progress is performed. In this manner, deterioration of the in-vehicle battery 11 is determined with reference to both the deterioration progress degree A and the deterioration progress degree B calculated by different methods. The notification that at least one of the deterioration progress degree A or the deterioration progress degree B is less than or equal to the set value C enables the user to know, for example, degradation progress of the in-vehicle battery 11 in an early stage.

The in-vehicle battery management device 40 is also configured such that if the deterioration progress degree B acquired from the electric vehicle 10 and the deterioration progress degree A calculated based on the charge/discharge information I are separated from each other by a predetermined value or more, a process of notifying a predetermined notification target is performed. If a difference between the deterioration progress degree A and the deterioration progress degree B calculated by different methods is large, a charge/discharge condition in normal charge/discharge might be inappropriately set. Since the user is notified in the case where the deterioration progress degree A and the deterioration progress degree B are separated from each other by the set value D or more, the user can take action, for example, reconsiders a charge/discharge condition such as a charge/discharge range early or has the in-vehicle battery 11 inspected. As a result, the in-vehicle battery 11 can be used for a longer time.

The notification target described above is not limited to the user. For example, an aggregator or a vehicle mechanic who inspects or maintains the electric vehicle 10, for example, may be notified. Notification of deterioration progress of the in-vehicle battery 11 to the aggregator or the vehicle mechanic encourages the aggregator or the vehicle mechanic to inspect the electric vehicle 10 or the in-vehicle battery 11. Accordingly, a cause of deterioration of the in-vehicle battery 11 can be found out so that the in-vehicle battery 11 can be used for a longer period, FIG. 6 is a flowchart depicting a procedure of a process of estimating a life of the in-vehicle battery 11, The in-vehicle battery management device 40 is configured to further perform a process S51 of storing the deterioration progress degree A calculated based on the charge/discharge information I, and a process S53 of estimating a life of the in-vehicle battery 11 based on the stored deterioration progress degree A.

Figure 6:
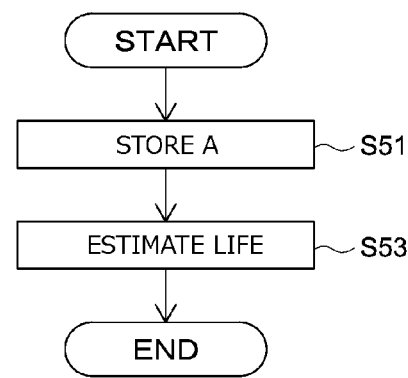
FIG. 6 is a flowchart depicting a procedure of a process of estimating a life of the in-vehicle battery 11.

In S51 of FIG. 6, the memory 51 stores the deterioration progress degree A calculated by the calculator 61. The deterioration progress degree A is stored in the deterioration progress degree database DB3. The deterioration progress degree database DB3 also stores a deterioration progress degree A calculated before process S51. In the deterioration progress degree database DB3, a use period obtained from a use start date of the electric vehicle 10 and a date when the deterioration progress degree A was calculated and the calculated deterioration progress degree A, for example, are accumulated in association.

In S53 of FIG. 6, the estimator 65 estimates a life of the in-vehicle battery 11 based on the stored deterioration progress degree A. A method for estimating the life of the in-vehicle battery 11 is not specifically limited. In this embodiment, from a correlation between the accumulated deterioration progress degree A and use period, a deterioration progress degree A after a lapse of a predetermined time from the present is estimated. For example, a fitting process may be performed by using a degree of deterioration progress as a function of a use period so that a correlation between the degree of deterioration progress and the use period is obtained. The user of the electric vehicle 10 may set a lower limit of the deterioration progress degree A of the in-vehicle battery 11, The lower limit of the deterioration progress degree A may also be set by, for example, an aggregator or a vehicle mechanic who inspects or maintain the electric vehicle 10. From the set lower limit and the correlation described above, a life of the in-vehicle battery 11 can be estimated.

As described above, the in-vehicle battery management device 40 is configured to perform the process of storing the deterioration progress degree A calculated based on the charge/discharge information I and the process of estimating the life of the in-vehicle battery 11 based on the stored deterioration progress degree A. With this configuration, a period in which the in-vehicle battery 11 can be used is obtained. The estimated life of the in-vehicle battery 11 may be, but not limited to, transmitted to the user terminal 15 through the third communicator 54, for example. The user can obtain the estimated life of the in-vehicle battery 11 from the user terminal 15.

The in-vehicle battery management device 40 is configured to further perform a process of setting a charge/discharge condition of the in-vehicle battery 11 based on the deterioration progress degree A calculated based on the charge/discharge information I. The charge/discharge condition here is a charge/discharge range or a charge/discharge current or voltage, for example, in using the electric vehicle 10 or charging/discharging the in-vehicle battery 11.

Here, the setter 66 sets a charge/discharge condition based on the deterioration progress degree A calculated by the calculator 61. In setting the charge/discharge condition, a degree of deterioration progress of the in-vehicle battery 11 obtained and information in charge/discharge by an aggregator can be used. If the deterioration progress degree A is low, a small charge amount of the in-vehicle battery 11 is set. That is, with deterioration of the in-vehicle battery 11 with time, the charge amount of the in-vehicle battery 11 is set to decrease stepwise. Deterioration of the in-vehicle battery 11 can further progress in the case of high SOC. If deterioration of the in-vehicle battery 11 progresses with the use of the electric vehicle 10, the full charge capacity of the in-vehicle battery 11 is low. Thus, if the charge amount of the in-vehicle battery 11 is not changed, the SOC in charging is relatively high. Since the charge amount of the in-vehicle battery 11 is set to decrease stepwise, the state of a high SOC in charging can be suppressed. The process of setting a charge/discharge condition of the in-vehicle battery 11 is performed based on the deterioration progress degree A calculated based on the charge/discharge information I so that deterioration of the in-vehicle battery 11 can be reduced.

The charge/discharge controller disclosed here has been described variously. The present disclosure is not limited to, for example, the embodiment described here unless otherwise specified. The in-vehicle battery management device and the in-vehicle battery management system disclosed here can be modified in various ways, and the constituent elements and the processes described here can be appropriately omitted or appropriately combined unless no particular problems arise.

What is claimed is:

1. An in-vehicle battery management device comprising:
a controller configured or programmed to control a charge/discharge device such that the charge/discharge device performs charge or discharge on an in-vehicle battery of an electric vehicle in a predetermined processing condition, the in-vehicle battery being connected to the charge/discharge device, wherein
in the electric vehicle, a degree of deterioration progress is calculated, and
the controller comprises:
a calculator configured or programmed to calculate a degree of deterioration progress of the in-vehicle battery based on charge/discharge information in the charge or discharge;
a communicator configured or programmed to notify a predetermined notification target of the calculated degree of deterioration progress;
an acquirer configured or programmed to acquire the degree of deterioration progress calculated in the electric vehicle; and
a first determiner configured or programmed to determine whether at least one of the degree of deterioration progress acquired from the electric vehicle or the degree of deterioration progress calculated based on the charge/discharge information is less than or equal to a predetermined value, wherein
the communicator configured or programmed to notify the predetermined notification target of the degree of deterioration progress if at least one of the degree of deterioration progress acquired from the electric vehicle or the degree of deterioration progress calculated based on the charge/discharge information is less than or equal to a predetermined value.

2. The in-vehicle battery management device according to claim 1, wherein in the electric vehicle, a degree of deterioration progress of the in-vehicle battery is set, and the controller further comprises a second communicator configured or programmed to encourage correction of the degree of deterioration progress set in the in-vehicle battery based on the degree of deterioration progress calculated based on the charge/discharge information, and receive a result on whether the degree of deterioration progress is corrected or not.

3. The in-vehicle battery management device according to claim 1, wherein the controller further comprises:

a memory configured or programmed to store the degree of deterioration progress calculated based on the charge/discharge information; and an estimator configured or programmed to estimate a life of the in-vehicle battery based on the stored degree of deterioration progress.

4. The in-vehicle battery management device according to claim 1, wherein the controller further comprises a setter configured or programmed to set a charge/discharge condition of the in-vehicle battery based on the degree of deterioration progress calculated based on the charge/discharge information.

5. An in-vehicle battery management device, comprising:

a controller configured or programmed to control a charge/discharge device such that the charge/discharge device performs charge or discharge on an in-vehicle battery of an electric vehicle in a predetermined processing condition, the in-vehicle battery being connected to the charge/discharge device, wherein in the electric vehicle, a degree of deterioration progress is calculated, and the controller further comprises:

a calculator configured or programmed to calculate a degree of deterioration progress of the in-vehicle battery based on charge/discharge information in the charge or discharge;

a communicator configured or programmed to notify a predetermined notification target of the calculated degree of deterioration progress;

an acquirer configured or programmed to acquire the degree of deterioration progress calculated in the electric vehicle; and a second determiner configured or programmed to determine whether the degree of deterioration progress acquired from the electric vehicle and the degree of deterioration progress calculated based on the charge/discharge information are separated from each other by a predetermined value or more, wherein the communicator configured or programmed to notify the predetermined notification target of the degree of deterioration progress if the degree of deterioration progress acquired from the electric vehicle and the degree of deterioration progress calculated based on the charge/discharge information are separated from each other by a predetermined value or more.

* * * * *